United States Patent [19]

Hayashi et al.

[11] Patent Number: 5,208,690
[45] Date of Patent: May 4, 1993

[54] LIQUID CRYSTAL DISPLAY HAVING A PLURALITY OF PIXELS WITH SWITCHING TRANSISTORS

[75] Inventors: Hisao Hayashi; Akio Kawamura, both of Kanagawa, Japan

[73] Assignee: Sony Corporation, Tokyo, Japan

[21] Appl. No.: 673,192

[22] Filed: Mar. 21, 1991

[30] Foreign Application Priority Data

Mar. 24, 1990 [JP] Japan ................... 2-074988
Jan. 25, 1991 [JP] Japan ................... 3-025501

[51] Int. Cl.$^5$ .......................................... G02F 1/13
[52] U.S. Cl. ........................................ 359/59; 359/54; 359/87; 359/88; 257/347
[58] Field of Search ................ 357/23.7, 4; 350/333, 350/334, 336; 340/784 C; 359/54, 59, 87, 88

[56] References Cited

U.S. PATENT DOCUMENTS

| | | | |
|---|---|---|---|
| 4,772,099 | 9/1988 | Kato et al. | 350/336 |
| 4,778,258 | 10/1988 | Parks et al. | 350/336 |
| 4,838,654 | 6/1989 | Hamaguchi et al. | 350/333 |
| 4,857,907 | 8/1989 | Koden | 350/336 |
| 4,938,566 | 7/1990 | Takeda et al. | 359/54 |
| 4,997,262 | 3/1991 | Sakono et al. | 350/333 |
| 5,003,356 | 3/1991 | Wakai et al. | 350/336 |
| 5,042,918 | 8/1991 | Suzuki | 359/59 |

FOREIGN PATENT DOCUMENTS

| | | | |
|---|---|---|---|
| 332456 | 9/1989 | European Pat. Off. | 350/336 G |
| 348209 | 12/1989 | European Pat. Off. | 340/784 G |
| 4112078 | 10/1991 | Fed. Rep. of Germany | 359/54 |
| 2641108 | 6/1990 | France | 259/54 |
| 58-62623 | 4/1983 | Japan | 350/336 |
| 58-106860 | 6/1983 | Japan | 357/4 |
| 58-186720 | 10/1983 | Japan | 350/334 |
| 61-13228 | 1/1986 | Japan | 350/334 |
| 61-156106 | 7/1986 | Japan | 350/334 |
| 62-69238 | 3/1987 | Japan | 350/336 |
| 1-73324 | 3/1989 | Japan | 359/54 |
| 1-76037 | 3/1989 | Japan | 357/23.7 |
| 1-170047 | 7/1989 | Japan | 357/23.7 |
| 1-223430 | 9/1989 | Japan | 350/336 |
| 1-255831 | 10/1989 | Japan | 340/784 |
| 2-44317 | 2/1990 | Japan | 359/87 |
| 2-65273 | 3/1990 | Japan | 359/54 |
| 2-72392 | 3/1990 | Japan | 340/784 G |
| 2-77017 | 3/1990 | Japan | 359/62 |

OTHER PUBLICATIONS

*Patent Abstracts of Japan*, vol. 13, No. 291 (P-893)[3639], Jul 6, 1989 of Published Japanese Application No. 1-73324A of Mar. 17, 1989.
*Patent Abstracts of Japan*, vol. 17, No. 239 (E930) May 21, 1990 of Published Application No. 2-65273 of Mar. 5, 1990.
*Patent Abstracts of Japan*, vol. 12, No. 435, (E683), Nov. 16, 1988 of Published Japanese Application No. 63 169066 of Jul. 13, 1988.
*Patent Abstracts of Japan*, vol. 11, No. 181, (P585) dated Jun. 11, 1987 of Japanese Published Application No. 62-010619 of Jan. 19, 1987.
*Patent Abstracts of Japan*, vol. 10, No. 152 (P492) dated Jun. 3, 1986 of Japanese Published Application No. 61-004030 of Jan. 9, 1986.

*Primary Examiner*—Rolf Hille
*Assistant Examiner*—Minhloan Tran
*Attorney, Agent, or Firm*—Hill, Steadman & Simpson

[57] ABSTRACT

Two contact holes are formed through an insulating layer at its portion corresponding to a drain of a switching thin film transistor and a height of a wall portion between the two contact holes is selected to be smaller than that of a surrounding insulating layer, whereby the transparent electrode is connected to the drain via the two contact holes with excellent coverage. Thus, a connection between the switching transistor and the transparent pixel electrode in the liquid crystal display device can be effected with improved reliability.

8 Claims, 14 Drawing Sheets

LIQUID CRYSTAL DISPLAY HAVING A PLURALITY OF PIXELS WITH SWITCHING TRANSISTORS

BACKGROUND OF THE INVENTION

1. Field of the Invention

The present invention generally relates liquid crystal display devices (LCDs) and, more particularly, is directed to an active matrix type liquid crystal display device in which a plurality of pixels, each having a switching transistor are aligned in a matrix form.

2. Description of the Prior Art

Figure 1:
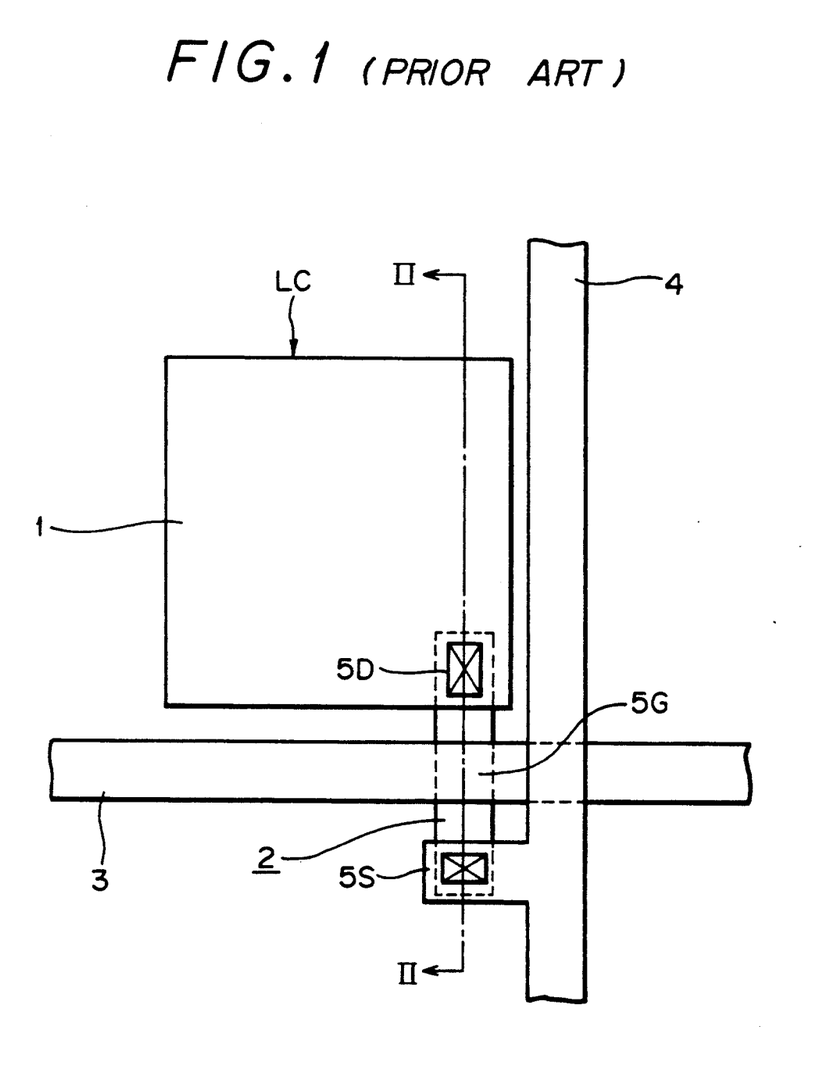
FIG. 1 is a plan view of one pixel of a conventional active matrix type liquid crystal display device.
Figure 2:
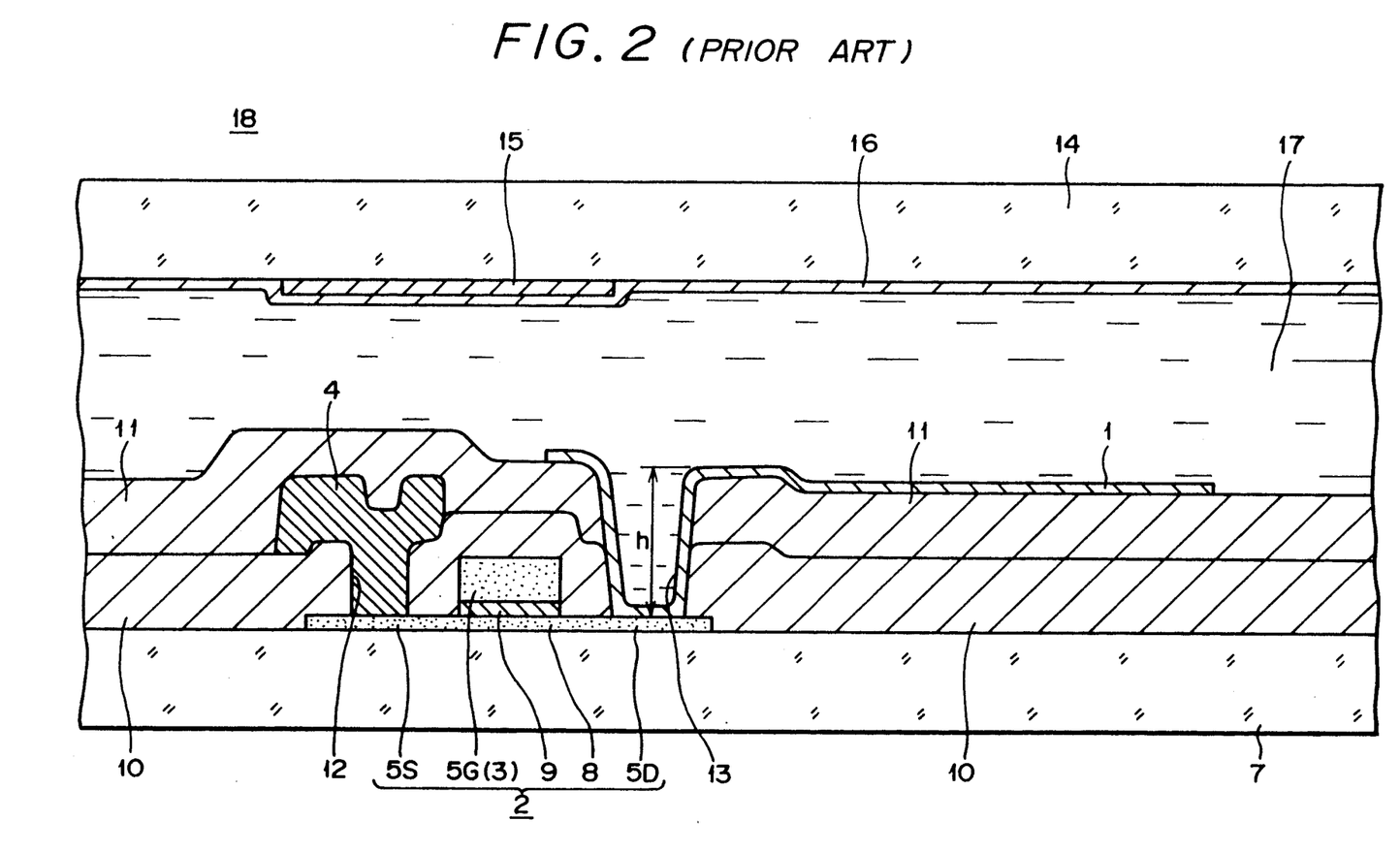
FIG. 2 is a cross-sectional view taken along the line II—II of FIG. 1.

The structure of one pixel of a conventional active matrix type liquid crystal display device is shown in FIGS. 1 and 2. In FIG. 1, reference numeral 1 designates a transparent pixel electrode constituting a pixel (a liquid crystal cell (LC)), and 2 a switching thin film transistor which drives the pixel. A selecting line 3 for selecting a row of the respective pixels (LC) is arranged between respective rows of the pixel electrodes 1, while a signal line 4 for supplying a video signal is arranged between respective columns of the pixel electrodes 1. Then, a drain 5D of the thin film transistor 2 is connected to the pixel electrode 1, its source 5S is connected to the signal line 4, and its gate 5G is connected to the signal line 3 (in FIG. 1, the gate 5G and the signal line 3 are used in common).

The specific structure thereof is as shown in FIG. 2, wherein a polycrystalline silicon layer 8 constituting the thin film transistor 2 is deposited at a required location on an insulating substrate 7 made of glass or the like, and on this polycrystalline silicon layer 8 there is formed the gate electrode 5G (or the selecting line 3) made of, for example, an impurity doped polycrystalline silicon through a gate insulating layer 9. A first insulating layer 10 made of, for example, a PSG (phospho-silicate glass) layer is formed over the entire surface of the gate electrode 5G so as to cover the same, and through a contact hole 12 formed through the first insulating layer 10 the signal line 4 made of, for example, Al is connected to the source 5S. Further, a second insulating layer 11 made of, for example, a PSG layer is deposited on the entire surface. Through, the first and second insulating layers 10 and 11, there is formed a common contact hole 13 at a position corresponding to the drain 5D, and then a transparent conductive layer made of, for example, an ITO (indium tin oxide) layer is formed on the entire surface including the contact hole 13. A patterning is performed therefor to form the transparent pixel electrode 1 which is connected to the drain 5D through the contact hole 13. Then, another insulating substrate 14 made of glass or the like which has a light shielding layer 15 formed in its inner surface at positions corresponding to a wiring portion (a portion where the selecting line 3, the signal line 4 and so on exist) and the thin film transistor 2 and an opposite electrode 16 formed on its entire surface including the light shielding layer 15 is disposed in opposition to the insulating substrate 7. A liquid crystal layer 17 is then enclosed between both the substrates 7 and 14 to thereby constitute a liquid crystal display device 18.

Figure 3:
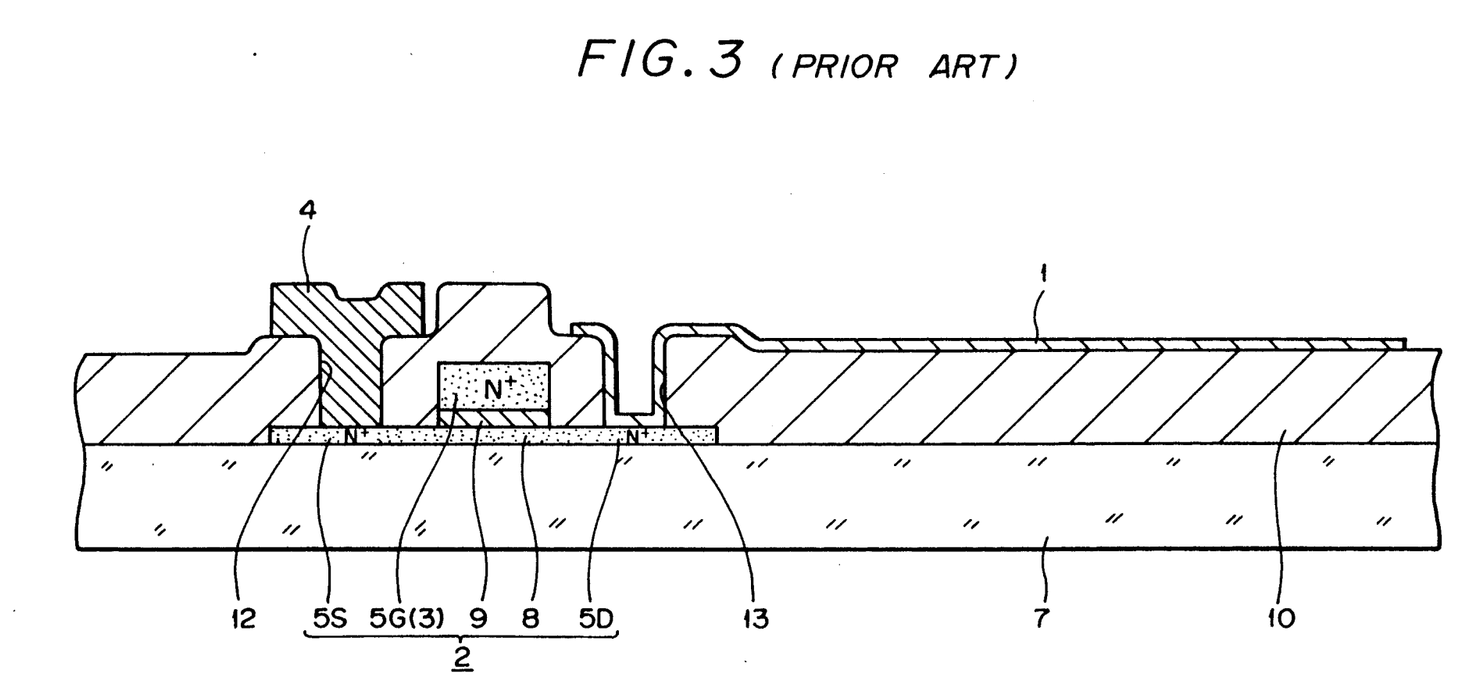
FIG. 3 is a cross-sectional view of another example of the conventional matrix type liquid crystal display device.

FIG. 3 shows another example of the convention liquid crystal display device. In this example, the thin transistor 2 formed of the polycrystalline silicon layer 8, the gate insulating layer 9 and the gate electrode 5G (i.e. the selecting line 3) is formed on the insulating substrate 7 on which the insulating layer 10 is formed. In the next process, the transparent pixel electrode 1 is formed by the ITO layer so as to be connected to the drain 5D of the thin film transistor 2 via the contact hole 13 of the insulating layer 10, and the signal line 4 made of, for example, Al is connected to the source 5S of the thin film transistor 2 via the contact hole 12 of the insulating layer 10.

Further, in the liquid crystal display device, in order to improve the pixels, additional capacitance i.e. storage capacitance $C_S$ must be added to every pixel LC, and it is preferable that the value of the storage capacitance $C_S$ is as large as possible in order to prevent the occurrence of flicker. To this end, as, for example, shown in FIG. 4, it is proposed that a polycrystalline silicon layer 8 is elongated from the source 5D and the storage capacitance $C_S$ is constructed between an elongated portion 8A of this polycrystalline silicon layer 8 and an electrode wiring 19 for exclusive use of the storage capacitance $C_S$ interconnected via an insulating layer (not shown).

One of the problems implied in the above-mentioned prior-art liquid crystal display device is the connection between the drain 5D of the thin film transistor 2 and the transparent pixel electrode 1. Due to the convenience for the manufacturing process, the polycrystalline silicon layer 8 of the thin film transistor 2 is formed in a lower portion, and the transparent pixel electrode 1 made of an ITO layer is formed on the topmost layer, whereby both are connected through the contact hole 13. However, the height h (FIG. 2) of this contact hole 13 has approximately 1 μm, which makes it difficult to connect the ITO layer 1 having a thickness of approximately 0.1 μm to 0.15 μm (film thickness because of the transparent pixel electrode) and formed of ITO layer with a favorable coverage. Therefore, the contact hole 13 is formed in a taper shape to provide an easier coverage, however, it cannot be said that the situation is 100% satisfactory.

Further, if the contact hole is made smaller (e.g. 0.5 μm to 1.0 μm) in order to increase an opening ratio of the pixel, then it becomes difficult to interconnect the ITO layer 1 with an excellent coverage, and the contact resistance between the drain 5D and the ITO layer 1 is unavoidably increased by the amount corresponding to the reduced area of the contact hole. Particularly, since the ITO layer 1 contains oxygen, the silicon surface of the contact portion with the thin film transistor is naturally oxidized, thereby the ohmic contact being deteriorated. If the contact hole is made small, reliability of contact is considerably scattered, which results in the concentration of display pixel being scattered.

On the other hand, in a liquid crystal display device in which the storage capacitance $C_S$ is provided, if the electrode wiring 19 used exclusively for the storage capacitance $C_S$ is made of the same conductive material as that of the gate electrode 5G, that is, the selecting line 3, then the opening ratio of the pixel is sacrificed for the provision of the electrode wiring 19. Accordingly, the contact hole must be made as small as possible but if the contact hole is made small, the contact between the transparent pixel electrode and the ITO layer is lowered in reliability. Then, there arise similar problems mentioned above. A defective contact between the transparent pixel electrode 1 and the thin film transistor 2 appears as a point defect on the liquid crystal display device, resulting in the image quality being deteriorated.

OBJECTS AND SUMMARY OF THE INVENTION

Accordingly, it is an object of the present invention to provide an improved liquid crystal display device which can substantially eliminate the aforenoted shortcomings and disadvantages encountered with the prior art.

More specifically, it is an object of the present invention to provide a high quality liquid crystal display device wherein the transparent pixel electrode is connected to the thin film transistor with a favorable coverage.

Another object of the present invention is to provide a liquid crystal display device in which defective contacts can be eliminated.

A further object of the present invention is to provide a liquid crystal display device in which point defects can be eliminated.

A yet further object of the present invention is to provide a liquid crystal display device of high quality.

As an aspect of the present invention, a liquid crystal display device is composed of a plurality of pixels respectively having a switching transistor aligned in a matrix form, wherein a plurality of contact holes through which a transparent pixel electrode of each of the pixels is connected to each of the switching transistors.

The above, and other objects, features and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to the accompanying drawings.

Figure 5:
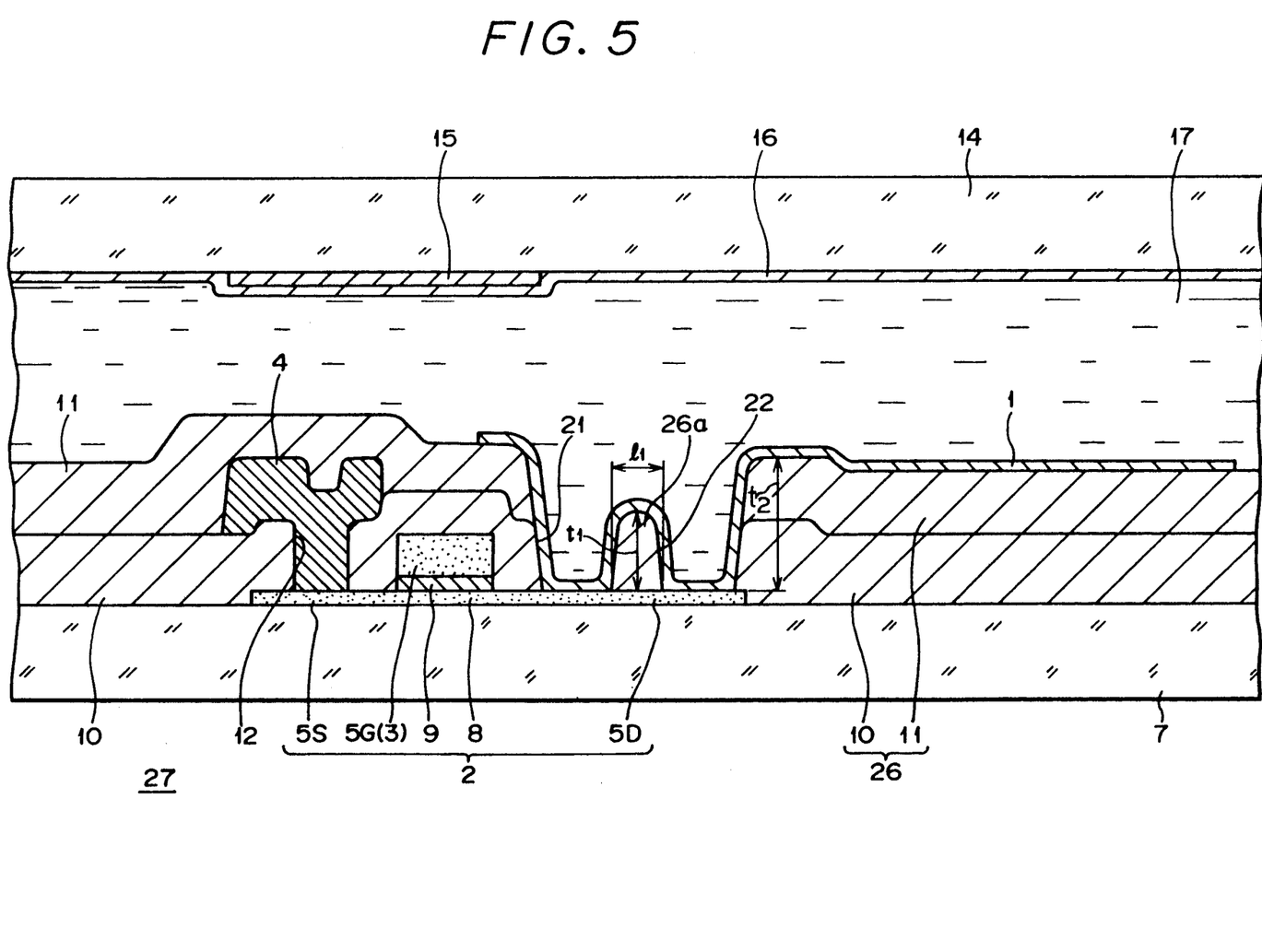
FIG. 5 is a cross-sectional view illustrating a first embodiment of the liquid crystal display device according to the present invention.

FIG. 5 shows a first embodiment of an active matrix type liquid crystal display device according to the present invention. FIG. 5 illustrates the structure of one pixel, wherein like parts corresponding to those in the foregoing FIG. 2 are marked with the same reference numerals. More specifically, reference numeral 1 designates a transparent pixel electrode made of, for example, an ITO layer, and 2 a switching thin film transistor. The thin film transistor 2 is constructed such that a polycrystalline silicon layer 8 is formed at a required location on an insulating substrate 7 made of glass, and a gate electrode 5G or a selecting line 3 made of, for example, an impurity doped polycrystalline silicon layer is formed on the polycrystalline silicon layer 8 through a gate insulating layer 9. The source 5S of the thin film transistor 2 is connected to a signal line 4 made of, for example, Al through a contact hole 12 formed through a first insulating layer 10. The transparent pixel electrode 1 is formed on a second insulating layer 11 in a predetermined pattern, one end of which is connected to the drain 5D of the thin film transistor 2. Opposite to this insulating substrate 7, an insulating substrate 14 made of glass having a light shielding layer 15 and an opposite electrode 16 formed on an inner surface thereof is disposed, and a liquid crystal layer 17 is enclosed between both the substrates 7 and 14.

Thus, in the first embodiment, in the connection of the drain 5D of the thin film transistor 2 with the transparent pixel electrode 1, a plurality of, in this embodiment, two contact holes 21 and 22 are formed through the two insulating layers 10 and 11 at a position corresponding to the drain 5D. The two contact holes 21 and 22 are respectively rectangular in plan view and adjacent to each other. A wall portion or an insulating layer 26a between both the contact holes 21 and 22 is formed to have a height $t_1$ lower than a height $t_2$ of a surrounding insulating layer 26 made up of the first and second insulating layers 10 and 11. For example, when the height $t_2$ of the surrounding insulating layer 26 formed of the two first and second insulating layers 10 and 11 is chosen to be 1 μm (the thickness of the first insulating layer 10 is 0.6 μm and the thickness of the second insulating layer 11 is 0.4 μm), the height $t_1$ of the insulating layer 26a between the contact holes 21 and 22 is chosen to be approximately 0.5 μm. Also, a length l1 between the contact holes 21 and 22 is below 10 μm or 2 μm in this embodiment, and the width of each of the contact holes 21 and 22 is respectively chosen to be 5 μm in this embodiment. Then, the transparent pixel electrode 1 is made to be connected to the drain 5D of the thin film transistor 2 through these two contact holes 21 and 22. Such contact holes 21 and 22 can be formed by utilizing a side etching.

Figure 6:
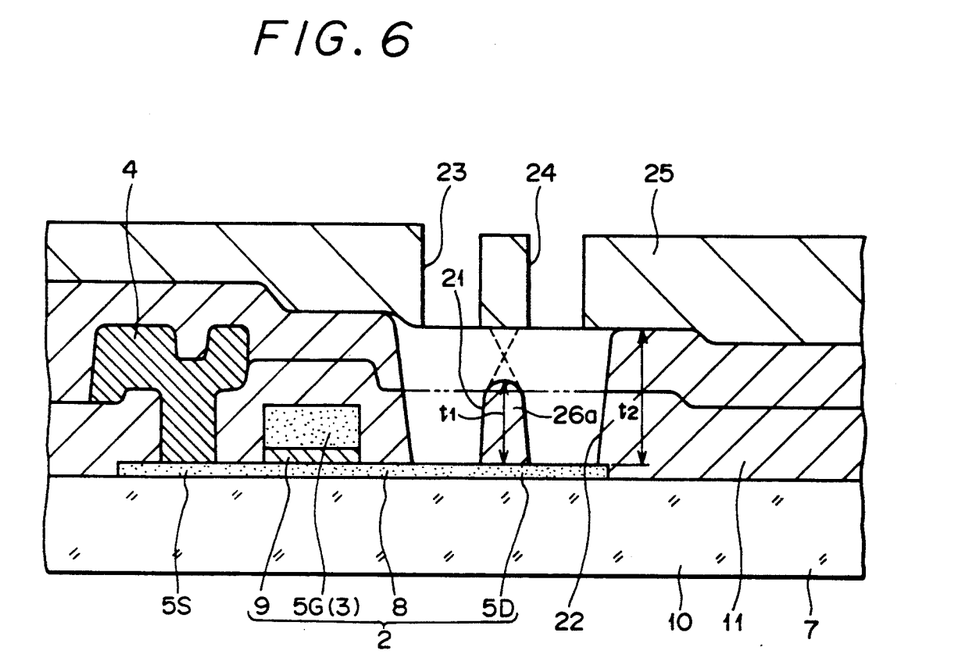
FIG. 6 is a cross-sectional view showing a method of forming contact holes.

More specifically, as shown in FIG. 6, the upper second insulating layer 11 is formed of a layer which is etched at a speed higher than the lower first insulating layer 10. When an etching is performed for the insulating layers 11 and 10 through a resist mask 25 having two openings 23 and 24 adjacent to each other, the insulating layer between both the openings 23 and 24 is removed by the side etching, with the result that both the contact holes 21 and 22 are formed by a single etching process, and the height $t_1$ of the insulating layer 26a between both the contact holes 21 and 22 is formed lower than the height $t_2$ of the surrounding insulating layer 26 made up of the two insulating layers 10 and 11. Further, by the side etching-process, the contact holes 21 and 22 are tapered in such a manner that the widths thereof become narrower as they become near the contact portions with the thin film transistor 2.

More specifically, the first insulating layer 10 is assumed to be a PSG layer heat-treated at temperatures more than 800° C., while the second insulating layer 11 is a PSG layer without heat treatment. Then, etching these layers through the resist mask 25 by an effervescent solution, the PSG layer heat-treated at temperatures more than 800° C. is etched at a speed faster than the PSG layer without heat treatment, which results in forming the contact holes 21 and 22 as shown in FIG. 6. Alternatively, assuming that the first insulating layer 10 is made of a PSG layer and the second insulating layer 11 a plasma SiN layer and they are etched through the resist mask 25 by a plasma etching method, a side etching is advanced in the plasma SiN layer at a speed approximately 10 times higher than the PSG layer, which results in forming the contact holes 21 and 22 as shown in FIG. 6.

According to the liquid crystal display device 27 constructed as described above, the transparent pixel electrode 1 is connected to the drain 5D of the thin film transistor 2 through the two contact holes 21 and 22, whereby the probability of occurrence of defective contact can be reduced in comparison with the conventional case where they are connected through a single contact hole. Further, since the height $t_1$ of the insulating layer 26a between the two contact holes 21 and 22 is made lower than the height $t_2$ of the surrounding insulating layer 26 made up of the first and second insulating layers 10 and 11, the transparent pixel electrode 1 extends to the higher insulating layer 26 above the insulating layer 26a which is made lower. Stated other way, the step caused by the contact holes 21 and 22 is apparently softened, whereby the coverage of the transparent pixel electrode 1 becomes satisfactory, and the defective contact is eliminated. Thus, the occurrence of point defect on the liquid crystal display device is removed, and accordingly a high quality liquid crystal display device is provided.

Although the contact dimension is made more or less large for forming the two contact holes 21 and 22, the polycrystalline silicon layer 8 constituting the thin film transistor 2 is approximately 0.04 μm which is thin enough to transmit a light, so that a loss of light is small. On the other hand, as shown in FIGS. 1 and 2, the polycrystalline silicon layer 8 included in the contact portion of the transparent pixel electrode 1 causes an inferior light transmission therethrough in comparison with other portions of the transparent pixel electrode 1, which may incur a fear that a substantial opening ratio of the liquid crystal cell is decreased. Since a smaller dimension of the contact portion may cause inconveniences such as an increase in the contact resistance, a deteriorated coverage of the transparent pixel electrode 1 in the contact hole 13, and so on, the dimension of the contact portion cannot be reduced easily.

Figure 8:
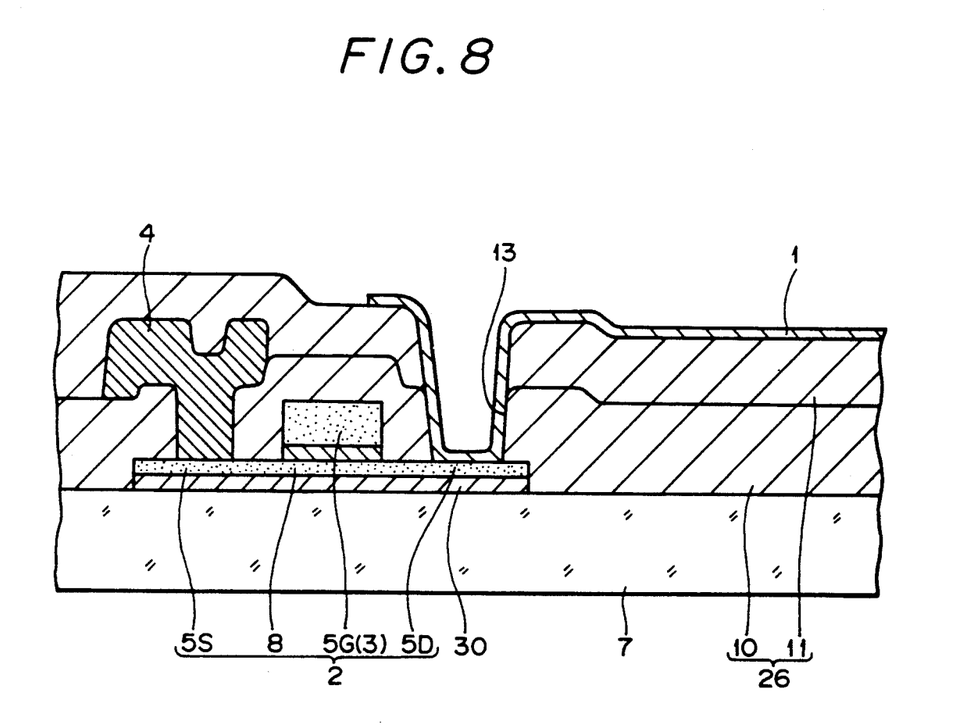
FIG. 8 is a cross-sectional view showing a main portion of a third embodiment of the present invention which improves the light transmittance in a contact portion of the transparent pixel electrode in the liquid crystal display device.

A third embodiment for improving this point is shown in FIG. 8. In this embodiment, between a polycrystalline silicon layer 8 constituting a thin film layer 2 and an insulating substrate 7 made of glass, there is formed a layer having an intermediate refractive index $n_3$ between the refractive index $n_1$ (=3.8) of the polycrystalline silicon and the refractive index $n_2$ (=1.45) of the glass substrate (SiO$_2$), for example, an Si$_3$N$_4$ layer 30 (refractive index $n_3$ = 1.9), wherein the transparent pixel electrode 1 is connected to the drain 5D of the polycrystalline silicon layer 8 through a contact hole 13. This Si$_3$N$_4$ layer 30 becomes a so-called reflection preventing layer. The rest of the structure is similar to FIG. 2.

Figure 9A:
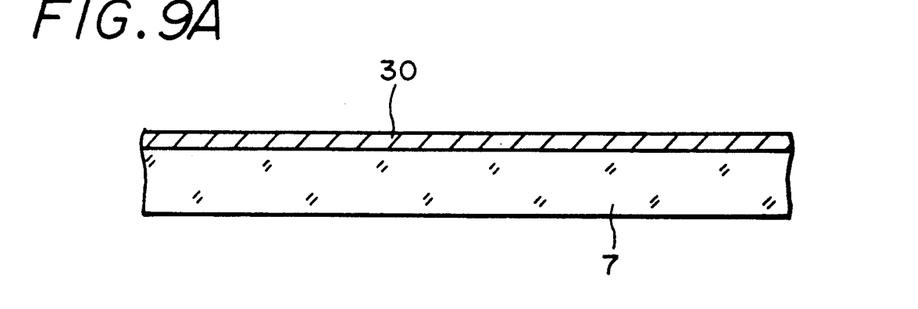
FIGS. 9A through 9D are process diagrams showing an example of the manufacturing method for producing the embodiment of FIG. 8, respectively.
Figure 9B:
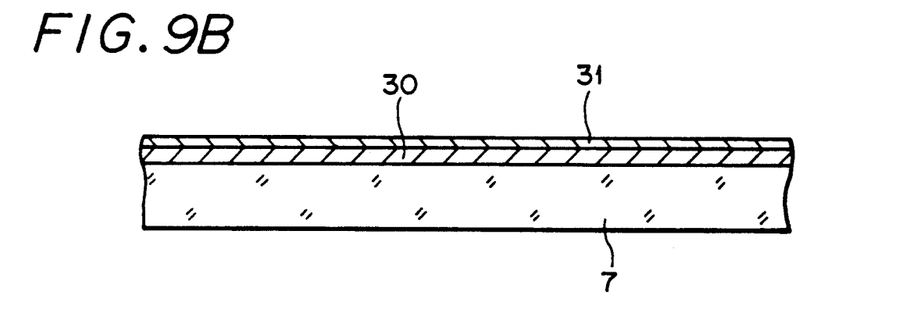
Figure 9C:
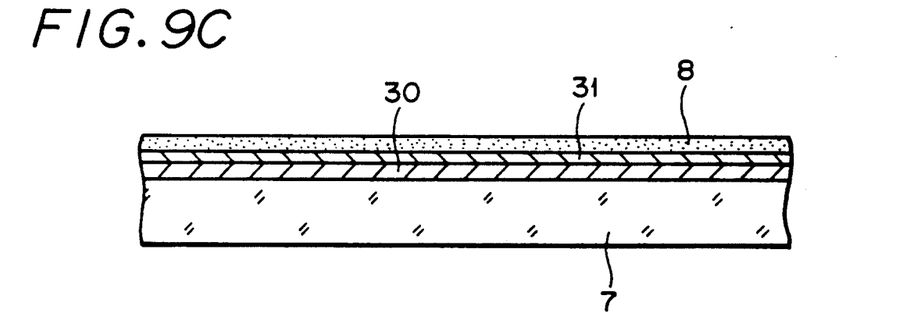
Figure 9D:
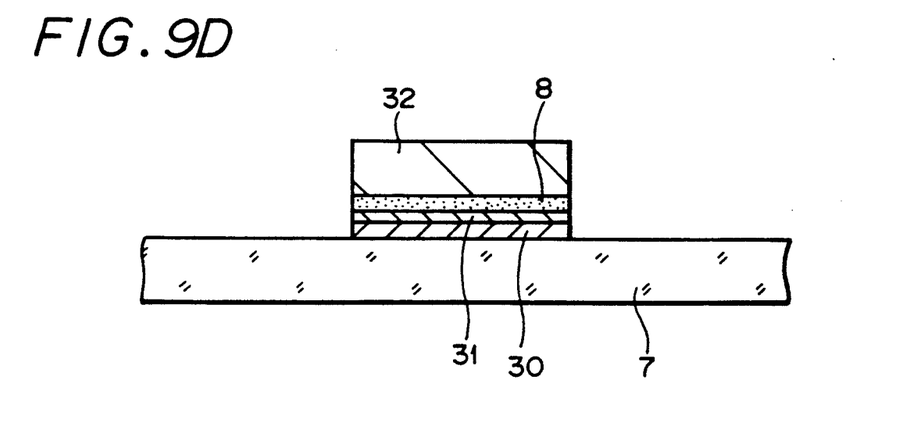

An example of a manufacturing method thereof is shown in FIGS. 9A to 9D. On the insulating substrate 7 made of glass, there is deposited an Si$_3$N$_4$ layer 30 having a thickness of approximately 0.07 μm (FIG. 9A) and, the surface of the Si$_3$N$_4$ layer 30 is slightly oxidized to form an SiO$_2$ layer 31 (FIG. 9B). A heat treatment, for example, in an oxidizing atmosphere at a temperature of 1000° C. for 20 minutes is performed to form the SiO$_2$ layer 31 of approximately 0.001 to 0.002 μm. This surface oxidization allows the next polycrystalline silicon layer 8 to be smoothly deposited. Next, after forming the polycrystalline silicon layer 8 having a thickness of, for example, approximately 0.04 μm on the SiO$_2$ layer 31 (FIG. 9C), the polycrystalline silicon layer 8, the SiC$_2$ layer 31 and the Si$_3$N$_4$, layer 30 are patterned through a resist mask 32 by, for example, a CF$_4$ plasma etching (FIG. 9D). Thereafter, the thin film transistor 2, the transparent pixel electrode 1 and so on are formed by way of an ordinary process identical to FIG. 2.

Figure 7:
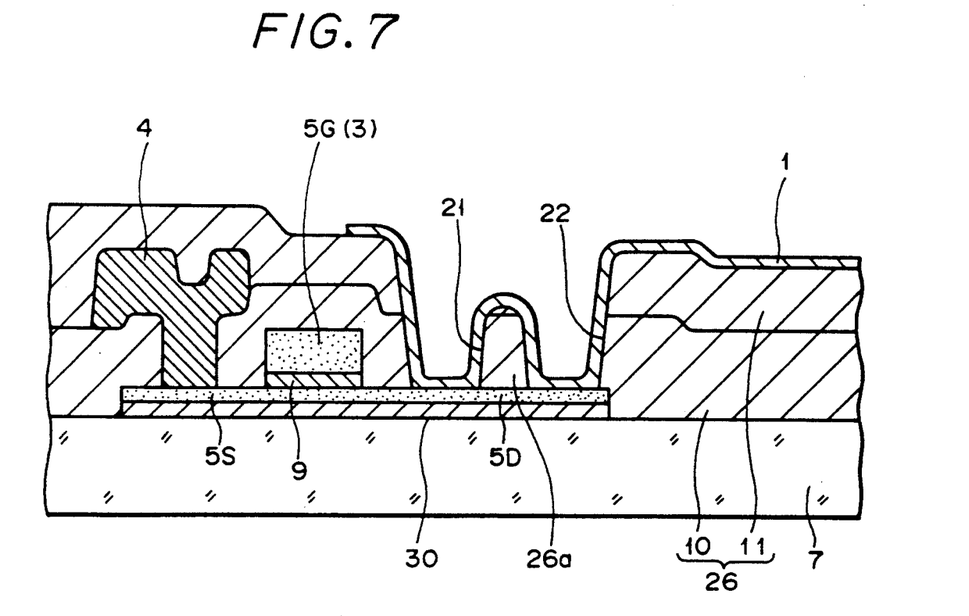
FIG. 7 is a cross-sectional view showing a main portion of a second embodiment of the liquid crystal display device according to the present invention.
Figure 10:
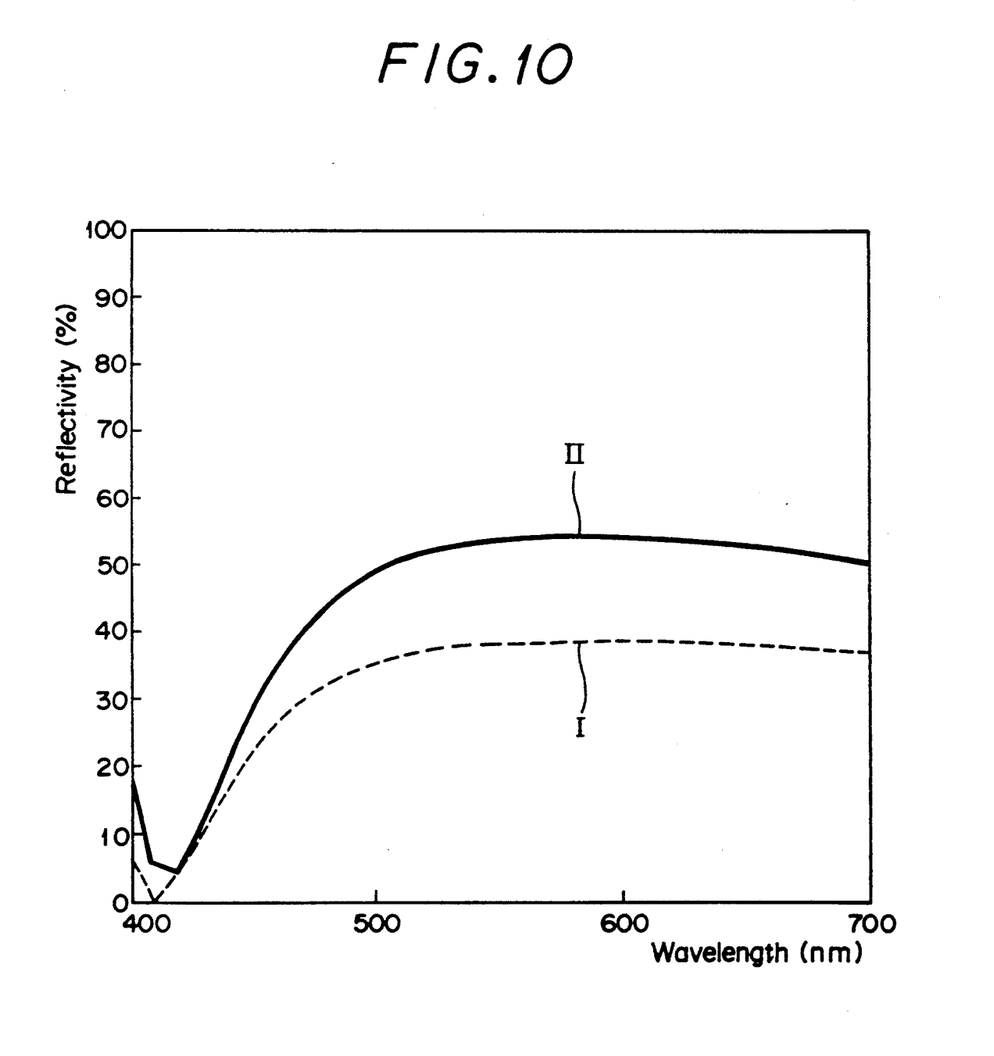
FIG. 10 is a graph showing the light transmittance.

An optimal thickness of the Si$_3$N$_4$, layer 30 is different depending on the thickness of the polycrystalline silicon layer 8. A curve I in FIG. 10 shows the light reflectivity when a light is incident from the substrate 7 side, wherein the thickness of the Si$_3$N$_4$ layer 30 is assumed to be 0.07 μm, and the thickness of the polycrystalline layer 8 is assumed to be 0.04 μm. However, a curve II shows the reflectivity when the Si$_3$N$_4$ layer 30 is not included. As is apparent from FIG. 10, when the Si$_3$N$_4$ layer 30 is formed beneath the polycrystalline silicon layer 8, the reflection by the polycrystalline silicon layer 8 is decreased by approximately 30%. Thus, in the active matrix type liquid crystal display device, the formation of the Si$_3$N$_4$ layer 30 beneath the polycrystalline silicon layer 8 constituting the thin film transistor 2 results in enhancing the transmittance in the contact portion with the transparent pixel electrode 1 and elevating the substantial opening ratio of the liquid crystal cell. It is needless to say that the present technique can be applied to the liquid crystal display device according to the present invention where the transparent pixel electrode 1 is connected through the aforementioned plurality of contact holes 21 and 22 as shown in FIG. 7.

Figure 11:
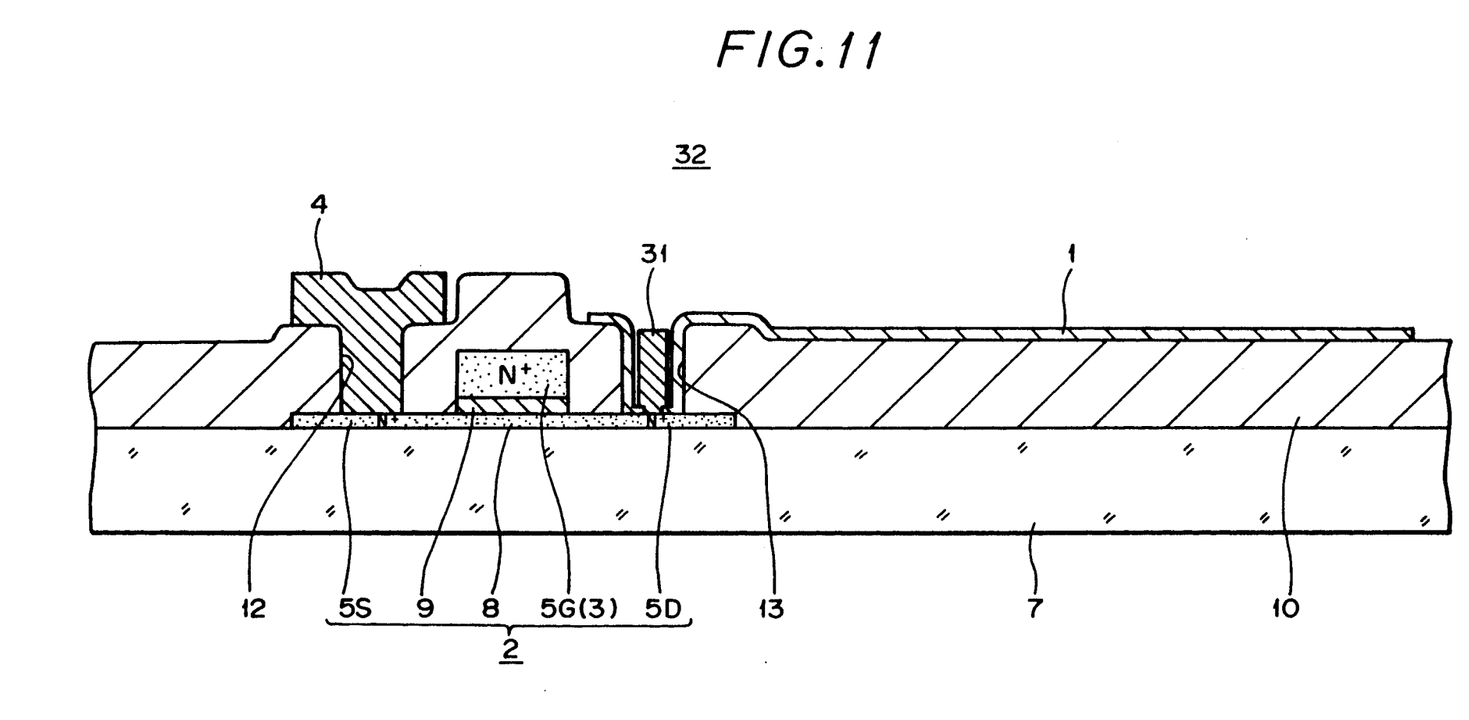
FIG. 11 is a cross-sectional view illustrating a fourth embodiment of the liquid crystal display device according to the present invention.
Figure 12:
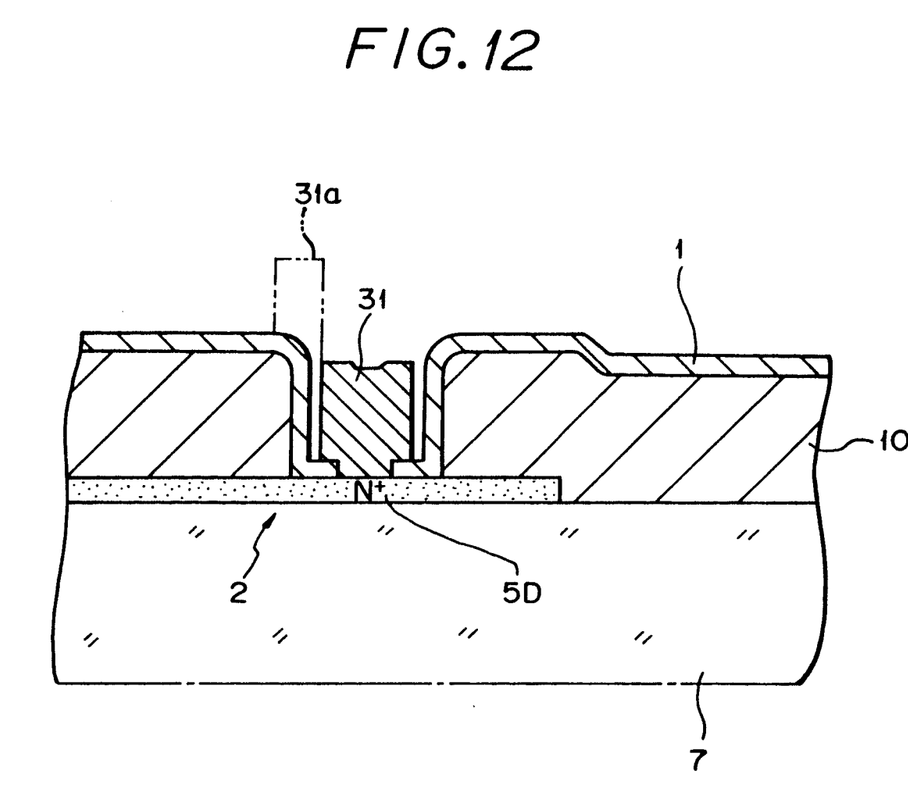
FIG. 12 is an enlarged cross-sectional view of a main portion of FIG. 11.

FIGS. 11 and 12 (FIG. 12 is an enlarged view of the contact portion shown in FIG. 11) illustrate a fourth embodiment of the active matrix type liquid crystal display device according to the present invention.

FIGS. 11 and 12 illustrate the insulating substrate in which the thin film transistor and the transparent pixel electrode are provided. In FIGS. 11 and 12, like parts corresponding to those of FIG. 3 are marked with the same references and therefore need not be described, and the rest of the arrangement of FIGS. 11 and 12 is the same as that of FIG. 5.

In the fourth embodiment, when the drain 5D of the thin film transistor 2 and the transparent pixel electrode 1 of the ITO layer are connected together, the transparent pixel electrode 1 is brought in contact with the drain 5D via the contact hole 13 and the transparent pixel electrode within the contact hole 13, i.e. one portion of the drain contact portion of the ITO layer 1 is removed to permit conductive material the same as the conductive material (e.g., Al. Cr, Ta, Cu, Mo, Au, Ni or alloy, etc.) of the signal line 4 to be buried into the contact hole 13. For example, if the signal line 4 is made of Al, an Al layer 31 is buried into the contact hole 13 to thereby cause the Al layer 31 and the ITO layer 1 and the Al layer 31 and the drain 5D to come in contact with each other, thus the drain 5D of the thin film transistor 2 and the transparent pixel electrode 1 being electrically connected.

In the manufacturing-process thereof, when the ITO layer is deposited on the entire surface including the contact hole 13 and is treated by the patterning-process to form the transparent pixel electrode 1, one portion of the ITO layer in contact with the drain 5D within the contact hole 13 is simultaneously removed upon selection. In the next process in which the signal line 4 is formed of Al, the Al layer 31 is formed within the contact hole 13 simultaneously.

If the pattern is carried out such that the Al layer 31 is formed up to the top of the contact hole 13 as shown by a chain line 31a of FIG. 12, then the absence of the ITO layer 1 can be covered by the Al layer 31.

According to the thus arranged liquid crystal display device 32, since the transparent pixel electrode 1 can directly be brought in contact with the drain 5D of the thin film transistor 2 through the contact hole 13 and the Al layer 31 is provided within the contact hole 13 so as to come in contact with both of the ITO layer of the transparent pixel electrode 1 and the drain 5D, the double contact can be carried out, thereby the transparent pixel electrode 1 and the drain 5D of the thin film transistor 2 being connected reliably. That is, the connection between the transparent pixel electrode 1 and the thin film transistor 2 can be increased in reliability. Accordingly, the signal can be written in the transparent pixel electrode 1 reliably and the point defect caused by the contact failure can be removed, thus making it possible to obtain the liquid crystal display device of high quality.

Further, since the transparent pixel electrode 1 and the thin film transistor 2 are connected partially via the Al layer 31, the contact resistance therebetween is reduced so that, regardless of the reduced contact hole, the contact resistance can be suppressed from being increased.

Furthermore, since one portion of the ITO layer within the contact hole 13 is simultaneously removed in the patterning-process of the ITO layer to form the transparent pixel electrode 1 and the Al layer 31 is simultaneously formed within the contact hole 13 in the patterning-process of the Al layer to form the signal line 4, only the mask pattern is changed and the manufacturing process is exactly the same as that of the example of the prior art.

Figure 13:
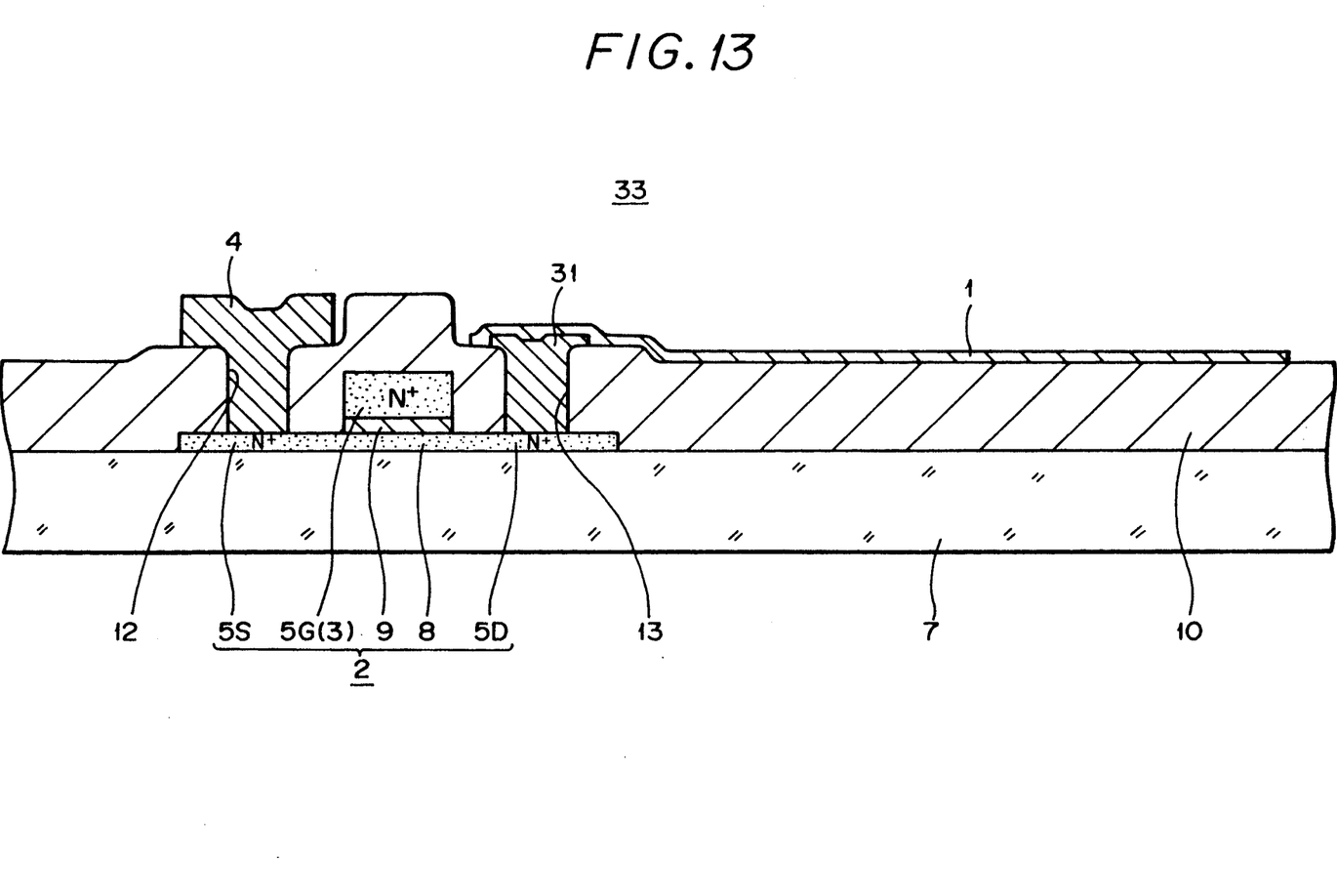
FIG. 13 is a cross-sectional view illustrating a fifth embodiment of the liquid crystal display device according to the present invention.

FIG. 13 shows a fifth embodiment of the active matrix type liquid crystal display device according to the present invention.

In this embodiment, the drain 5D of the thin film transistor 2 and the transparent pixel electrode 1 made by the ITO layer are connected by the same conductive material as that of the signal line 4, i.e. the Al layer 31 in this embodiment. More specifically, the Al layer 31 is buried into the contact hole 13 so as to come in contact with the drain 5 and the transparent pixel electrode 1 is formed so as to come in contact with the Al layer 31, whereby the drain 5D and the transparent pixel electrode 1 are connected.

In the manufacturing process of the fifth embodiment of the invention, when the signal line 4 is formed by Al, the Al layer 31 is buried within the contact hole 13 and then the transparent pixel electrode 1 is formed so as to be connected with the upper surface of the Al layer 31.

According to the thus arranged liquid crystal display device 33, since the Al layer 31 is buried into the contact hole 13 and the transparent pixel electrode 1 and the drain 5D of the thin film transistor 2 are connected via the Al layer 31, the level difference in the contact hole 13 can be alleviated, the coverage of the transparent pixel electrode 1 can be improved and the contact failure can be avoided. Thus, the occurrence of the point defect in the liquid crystal display device can be avoided and the liquid crystal display device of high quality can be obtained.

Figure 14:
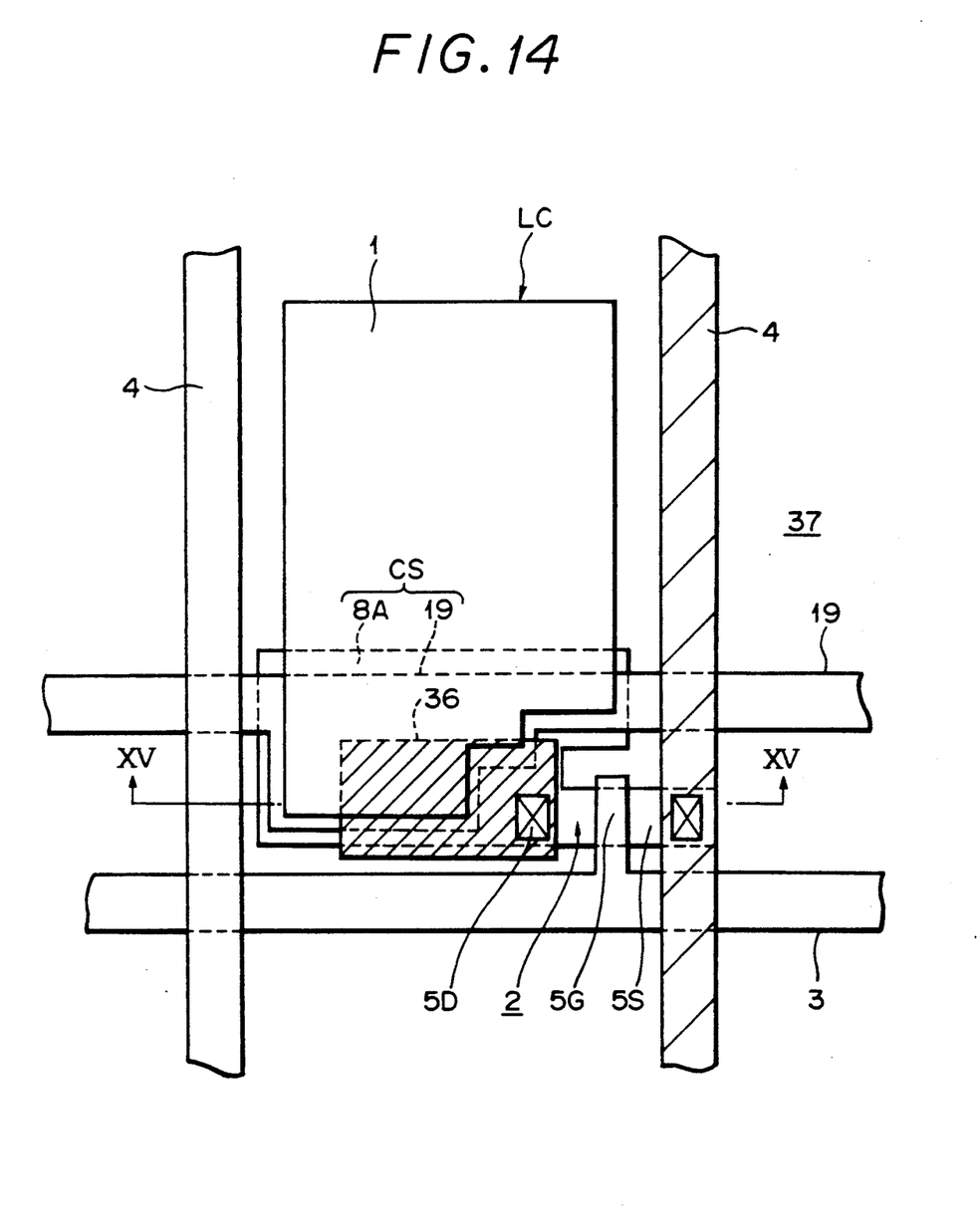
FIG. 14 is a plan view illustrating a sixth embodiment of the liquid crystal display device according to the present invention.
Figure 15:
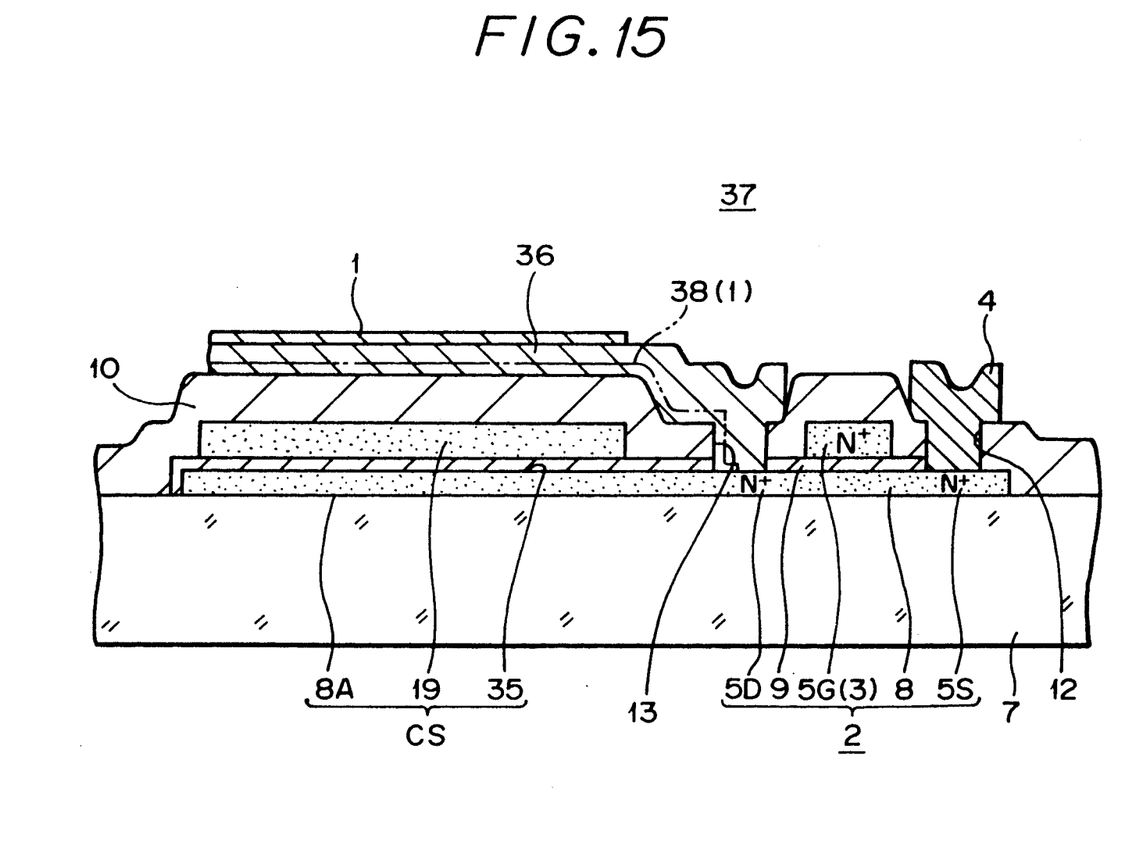
FIG. 15 is a cross-sectional view taken through the line XV—XV of FIG. 14.

FIGS. 14 and 15 illustrate a sixth embodiment of the active matrix type liquid crystal display device according to the present invention.

Figure 4:
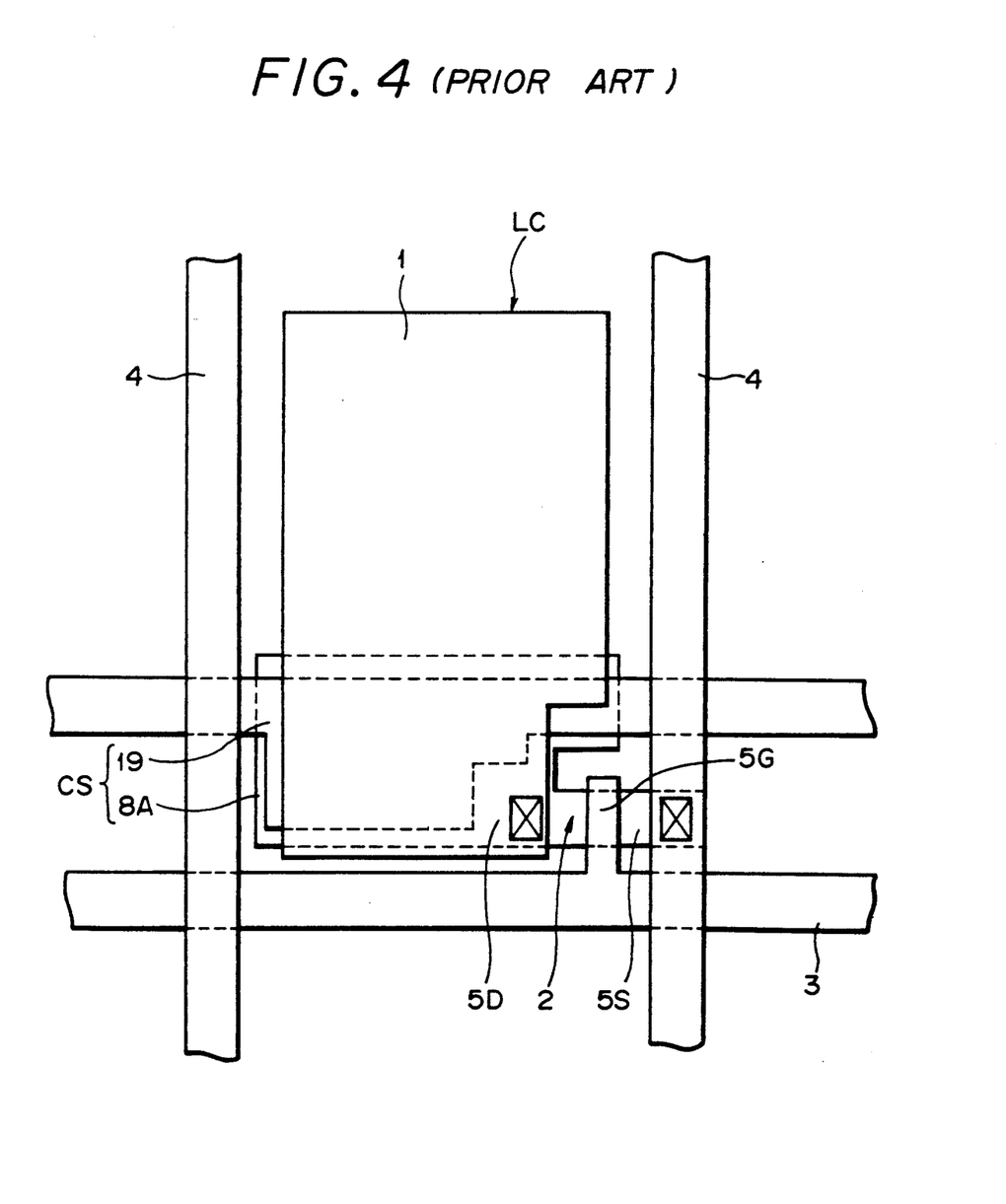
FIG. 4 is a plan view of one pixel showing other example of the conventional active matrix type liquid crystal display device.

FIGS. 14 and 15 show a structure of one pixel and in FIGS. 14 and 15, like parts corresponding to those of FIG. 4 are marked with the same references. In FIG. 14, reference numeral 1 designates the transparent pixel electrode made by the ITO layer, 2 the switching thin film transistor, 3 the selecting line integrally formed with the gate electrode 5G of the thin film transistor 2 and 4 the signal line connected to the source 5S of the thin film transistor 2. $C_S$ designates the storage capacitance and this storage capacitance $C_S$ is composed of the extended portion 8A of the polycrystalline silicon 8 which constructs the thin film transistor 2, the insulating layer (i.e. dielectric layer) 35 simultaneously formed with the gate insulating layer 9 of, for example, the thin film transistor 2 and the $C_S$-exclusive-use electrode wiring 19 formed simultaneously with the gate electrode 5D, that is, the selecting line 4 by the same conductive material such as the impurity doped polycrystalline silicon. The insulating layer 10 is formed on the gate electrode 5G and the storage capacitance $C_S$.

In this embodiment, the insulating layer 10 has the contact holes 12 and 13 to which the source 5S and the drain 5D of the thin film transistor 2 are opposed respectively, and then the signal line 4 which is connected to the source 5S via the contact hole 12 is formed. At the same time when the signal line 4 is formed, the layer 36 made of the same conductive material as that of the signal line 4, if the signal line 4 is made of Al similarly as described before, made of Al is formed on the insulating layer 10 at its portion corresponding to the storage capacitance $C_S$. Then, the transparent pixel electrode 1 made by the ITO layer is formed so as to contact with the surface of the Al layer 36. In other words, in this embodiment, the transparent pixel electrode 1 and the drain 5D of the thin film transistor 2 are connected via the Al layer 36 on the region in which the storage capacitance is formed. While the ITO layer of the transparent pixel electrode 1 is formed on the Al layer 36 in contact therewith in FIG. 15, the positional relation between the ITO layer and the Al layer may be reversed. That is, the ITO layer of the transparent pixel electrode 1 is initially deposited as indicated by a two dot chain line 38 of FIG. 15, and thereon the Al layer 36 may be formed. Further, at that time, the ITO layer 38(1) may be extended into the contact hole 13 so as to contact with one portion of the drain 5D as shown by a two-dot chain line in FIG. 15.

In accordance with the thus arranged liquid crystal display device 37, since the drain 5D of the thin film transistor 2 and the transparent pixel electrode 1 are connected via, for example, the Al layer 36 made of the same conductive material as that of the signal line 4 on the storage capacitance forming region, the transparent pixel electrode 1 and the thin film transistor 2 can be connected with improved reliability without lowering the opening ratio of the pixel. That is, since the drain connection is carried out by the same material of the signal line 4 in the source connection, e.g. the Al layer 36, reliability of the drain connection can be improved. Further, since the Al layer 36 and the ITO layer of the transparent pixel electrode 1 are connected on the storage capacitance forming region of large dimension, reliability for such connection can be improved. Simultaneously, since the storage capacitance forming region is the light-shielding region, the dimension of the transparent pixel electrode 1 can be prevented from being affected and the opening ratio of the pixel can be prevented from being lowered. As described above, according to the liquid crystal display device 37 of this embodiment, since the transparent pixel electrode and the thin film transistor can be connected with improved reliability, the occurrence of the point defect can be avoided and the display characteristic between adjacent pixels can be suppressed from being scattered, thus the display quality being improved.

According to the liquid crystal display device of the present invention, it is possible to reduce the probability of occurrence of defective contacts by connecting a transparent pixel electrode to a thin film transistor through a plurality of contact holes. Further, by making the height of an insulating layer between the plurality of contact holes lower than the height of a surrounding insulating layer, the coverage of the transparent pixel electrode in a contact portion becomes satisfactory, and defective contacts are eliminated. It is therefore possible to provide a high quality liquid crystal display device without point defects in the liquid crystal display device.

Further, according to the liquid crystal display device of the present invention, since the transparent pixel electrode is brought in direct contact with the thin film transistor and the thin film transistor and the transparent pixel electrode are brought in contact with each other via the same material as that of the signal line, i.e. the transparent pixel electrode and the thin film transistor are brought in contact with each other doubly, both of the transparent pixel electrode and the thin film transistor can be connected reliably. Further, since the thin film transistor and the transparent pixel electrode are connected via the same material as that of the signal line, the contact resistance at the contact portion can be reduced.

Furthermore, according to the liquid crystal display device of the present invention, since the transparent pixel electrode is connected to the thin film transistor via the same material as that of the signal line, both of the transparent pixel electrode and the thin film transistor can be connected positively, and the contact resistance at the contact portion can be reduced.

Accordingly, the point defect inherent in the liquid crystal display device can be removed, and the liquid crystal display device of high display quality can be obtained.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A liquid crystal display device composed of a plurality of pixels respectively having switching transistors and aligned in a matrix form, comprising:
a plurality of contact holes through which a transparent pixel electrode of each of said pixels is connected to each of said switching transistors.

2. A liquid crystal display device according to claim 1, wherein said transparent pixel electrode is disposed over an insulating layer, said insulating layer having a thickness not less than a height of a wall portion between the plurality of contact holes.

3. A liquid crystal display device according to claim 1, wherein each of the contact holes is tapered so as to reduce the width toward a contact portion between each switching transistor and the associated transparent pixel electrode.

4. A liquid crystal display device according to claim 1, wherein said switching transistors are disposed on an insulating substrate through a reflection-preventing layer.

5. A liquid crystal display device comprising:
a first substrate having an electrode on the inner surface thereof;
a second substrate opposed to the first substrate and having an array of pixels, each pixel comprising a transparent pixel electrode, and a switching transistor electrically connected to the transparent pixel electrode by means of at least two contact holes;
signal lines associated with columns of the pixels in the matrix; and
address lines associated with rows of the pixels in the matrix; and
a liquid crystal layer sandwiched between the first and second substrates.

6. A liquid crystal display device according to claim 5, wherein said switching transistor is disposed on a reflection preventing layer which is selectively disposed on the second substrate.

7. A liquid crystal display device according to claim 6, wherein said reflection preventing layer comprises a silicon nitride.

8. A liquid crystal display device according to claim 5, wherein said switching transistor comprises thin film of silicon selectively disposed on the second substrate for defining source, channel and drain regions, a gate insulating film disposed on the thin film of silicon and a gate electrode on the gate insulating film.

* * * * *